No. 690,911.  
G. F. PECK.  
QUOIN LOCK.  
(Application filed July 28, 1898. Renewed June 18, 1901.)  
Patented Jan. 7, 1902.

(No Model.)

WITNESSES:  
C. A. Pierce.  
J. P. Altizer

INVENTOR  
George F. Peck.  
BY A. M. Pierce  
ATTORNEY.

UNITED STATES PATENT OFFICE.

GEORGE F. PECK, OF BROOKLYN, NEW YORK.

QUOIN-LOCK.

SPECIFICATION forming part of Letters Patent No. 690,911, dated January 7, 1902.

Application filed July 28, 1898. Renewed June 18, 1901. Serial No. 65,082. (No model.)

*To all whom it may concern:*

Be it known that I, GEORGE F. PECK, a citizen of the United States, residing in Brooklyn, Kings county, State of New York, have invented a new and useful Improvement in Quoin-Locks, of which the following is a specification.

My invention relates especially to devices employed for securing type, &c., within chases of printing-presses, and has for its object the provision of means and mechanism for locking any ordinary rack-quoin against slipping or loosening when the form is locked up and upon a press.

To obtain the desired end, my invention consists, essentially, in a lock formed of a metallic bar provided with short arms extending at right angles to the body thereof, said lock being arranged to be removably placed in the keyway of a quoin after the locking of a form, the short arms entering the oppositely-disposed rack-teeth, preventing the slipping or loosening of the quoin by reason of the jarring when the press is in operation, all of which will be hereinafter first fully described and then pointed out in the claims.

Figure 1:
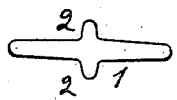
Figure 2:
Figure 3:
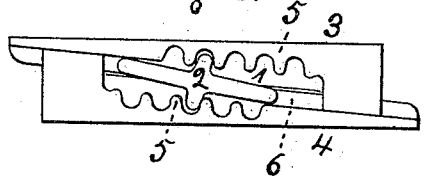

In the accompanying drawings, forming a part hereof, Figure 1 is a plan view, and Fig. 2 a side elevation, of my quoin-lock. Fig. 3 is a plan view of a quoin, showing the lock in place therein.

Similar numerals of reference, wherever they occur, indicate corresponding parts in all the figures.

1 is a bar made of any approved material and provided with arms 2, projecting therefrom at right angles and preferably near the center of the bar.

3 and 4 are the two wedge-shaped parts of a quoin made in the usual manner and provided with racks 5 and depressed keyway 6.

When constructed and arranged in accordance with the foregoing description, the operation of my extremely simple and cheap quoin-lock is as follows: The quoin being tightened up in place in the well-known manner, my locks are dropped into place, as particularly shown in Fig. 3 of the drawings, and no matter how great the jar of the form when in a moving press the quoins cannot become loosened, so as to slip or be moved from place. In releasing the quoin the lock is simply removed from the keyway.

Having now fully described my invention, what I claim as new therein, and desire to secure by Letters Patent, is—

1. A removable quoin-lock, consisting of a flat body having four arms, and arranged to lie in the keyway of a quoin, two of said arms engaging with the racks of the quoin, substantially as shown and described.

2. The combination with a quoin made in two parts, each part being provided with a rack and keyway, as set forth, of a removable lock consisting of a flat body having four arms arranged to drop within the keyway, two of the arms engaging with the racks, substantially as shown and described.

Signed by me at New York this 18th day of May, 1898.

GEORGE F. PECK.

Witnesses:
C. A. PIERCE,
A. M. PIERCE.